United States Patent [19]

Niggemann

[11] Patent Number: 4,516,987

[45] Date of Patent: May 14, 1985

[54] DEAERATOR USABLE IN A SYSTEM FOR A STEAM POWERED TORPEDO AND DEAERATING METHOD

[75] Inventor: Richard E. Niggemann, Rockford, Ill.

[73] Assignee: Sundstrand Corporation, Rockford, Ill.

[21] Appl. No.: 515,591

[22] Filed: Jul. 21, 1983

[51] Int. Cl.³ .............. B01D 19/00; F42B 19/00; F04B 23/04

[52] U.S. Cl. .............................. 55/52; 55/199; 114/20 A; 417/77; 494/56; 494/65

[58] Field of Search ............ 55/39, 52, 55, 189, 55/190, 199; 114/20 A, 20 R, 38, 44, 47, 238; 417/77; 494/27, 43, 56, 65

[56] References Cited

U.S. PATENT DOCUMENTS

| | | | |
|---|---|---|---|
| 1,472,874 | 11/1923 | Krick | 417/77 |
| 2,452,421 | 10/1948 | Ames | 417/77 |
| 3,109,401 | 11/1963 | Karig | 114/20 A |
| 3,327,669 | 6/1967 | Olson | 114/20 R |
| 3,960,319 | 6/1976 | Brown et al. | 494/43 X |

Primary Examiner—Charles Hart
Attorney, Agent, or Firm—Wood, Dalton, Phillips, Mason, & Rowe

[57] ABSTRACT

An apparatus and method for removing air and other gases entrained in water or other liquid and, more particularly from water delivered from a steam condenser and used in a steam-generating system for powering a prime mover of a torpedo. The apparatus includes a rotatable drum for centrifuging a volume of water and air to separate the water from the air, a pitot probe for drawing water from the container under pressure, a water-driven air jet pump within the rotatable drum and communicating with the separated air to pump the air into a collection chamber and build up the pressure thereof, a nozzle for directing a portion of the water drawn through the pitot probe to the air jet pump for operation thereof and a relief valve for controlling the discharge of air under pressure from the collection chamber to an exhaust area which may be a pressurized area within the torpedo.

11 Claims, 3 Drawing Figures

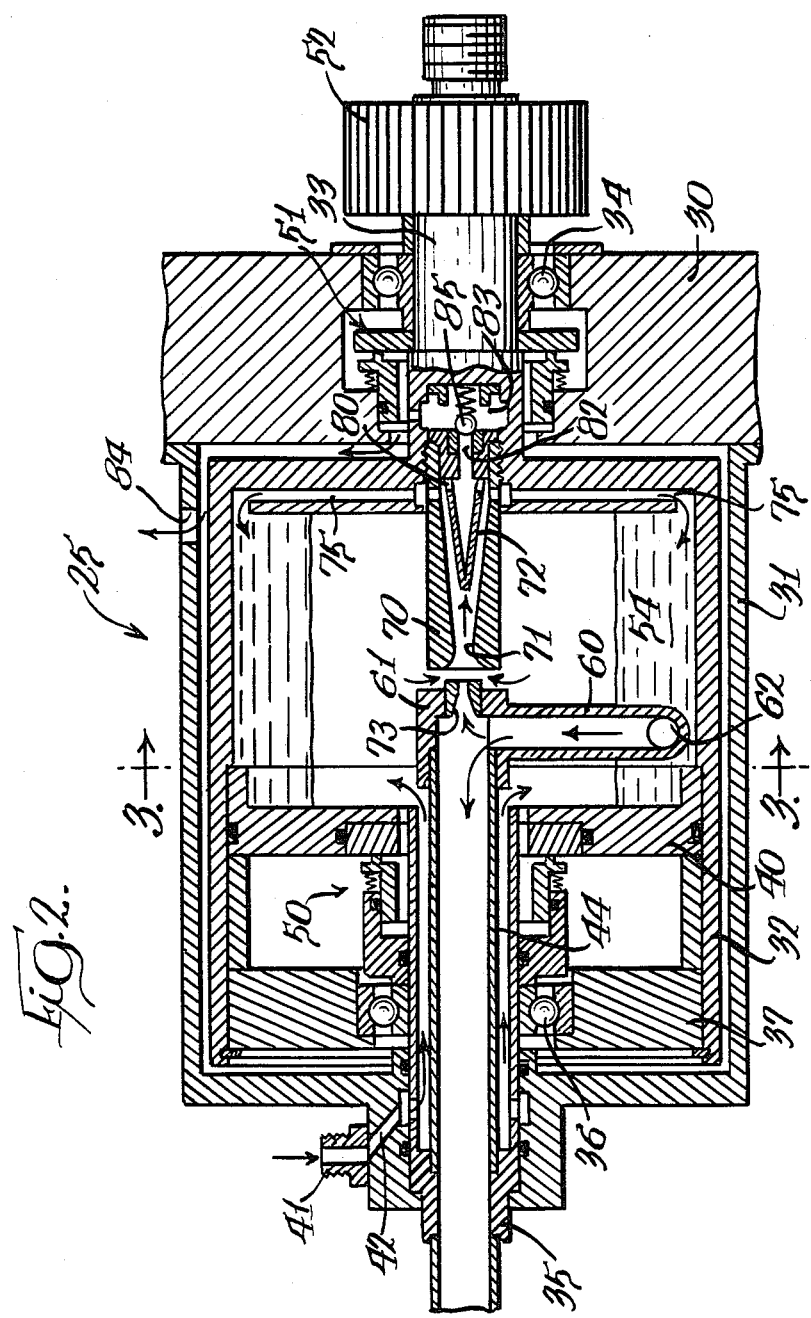

DEAERATOR USABLE IN A SYSTEM FOR A STEAM POWERED TORPEDO AND DEAERATING METHOD

DESCRIPTION

1. Technical Field

This invention pertains to a deaerator having a primary use in a steam generating system for a steam powered torpedo. The deaerator operates to remove air and other noncondensable gases from water to increase the rate of condensation of steam in a steam condenser. The deaerator also functions as a boost pump for delivering water to the main system pump which delivers water to a boiler in the steam generating system and provides for accumulation of water to accommodate changes in the water demand of the steam generating system.

2. Background Art

Steam powered torpedoes have been provided with a prime mover, in the form of a steam turbine, with high pressure steam being generated by a boiler. The steam leaving the steam turbine at a low pressure is directed to a steam condenser and water leaving the condenser is returned to the boiler by a main system pump.

The efficiency of a steam turbine is dependent on the ability of the steam condenser to maintain a low back pressure on the steam turbine. The ability of steam to condense at very high rates is greatly impeded by the presence of even very small quantities of noncondensable gas that may be present in the steam, such as air that was not completely purged from the water on start-up of the system, or hydrogen and oxygen from thermal disassociation of the steam.

The ability of the steam condenser to perform is also dependent on how much liquid is stored in the channels of the steam condenser. Such liquid effectively blocks that portion of the condenser from the condensation process. The amount of liquid stored in the steam condenser is a function of the initial charge of water in the steam generating system, the power level at which the steam generating system is being run, and the means provided in the system for accumulating and storing the boiler inventory water between high and low power levels.

Prior steam generating systems have not provided adequate means for minimizing the presence of air and other noncondensable gases in the steam and in the water leaving the steam condenser and directed to the boiler by use of a deaerator which can also function as an accumulator for accumulating adequate water, dependent upon the operating level of the steam generating system and which acts as a boost pump for supplying pressurized liquid to the main system pump.

It is known in the prior art to separate fluids by use of a centrifugal separator and to withdraw one of the separated fluids by use of a pitot tube as shown in Brown et al Pat. No. 3,960,319.

DISCLOSURE OF THE INVENTION

The primary feature of the invention is to provide a deaerator for a steam generating system and, particularly, a deaerator usable in a steam powered torpedo which also functions as a boost pump and accumulator.

Another feature of the invention is to provide a deaerator as defined in the preceding paragraph for a steam powered torpedo having a steam turbine and wherein the turbine pressure ratio is improved by maintaining a low back pressure at the outlet of the steam turbine by withdrawing air from the condensate and discharging the air into a pressurized area of the torpedo while maintaining the back pressure at a pressure value essentially below that of the pressurized area of the torpedo.

Still another feature of the invention is to provide a deaerator which utilizes a rotatable drum for receiving water with entrained air and which, by centrifugal force, separates the water from the air and having a pitot probe located within the drum for drawing water under pressure from the drum for delivery to the boiler. A portion of the flow through the pitot probe supplies a water-driven jet pump which draws air from the central part of the rotatable drum and directs the air to a collection chamber wherein it is pressurized to a value in excess of that existing in an exhaust space and then discharged to said exhaust space.

An additional feature of the invention is to provide a method of removing entrained air from liquid comprising centrifuging a volume of liquid and air within a container to separate the liquid from the air, drawing liquid from the container under pressure, diverting a portion of the liquid under pressure to a liquid-driven air jet pump communicating with the separated air to pump air into a collection chamber and build up the pressure of the air within the chamber, and discharging pressurized air from the collection chamber to a discharge area when the pressure of the air exceeds that in said discharge area.

BRIEF DESCRIPTION OF THE DRAWINGS

FIG. 2 is a central vertical section of a deaerator used in the steam generating system.

BEST MODE FOR CARRYING OUT THE INVENTION

Figure 1:
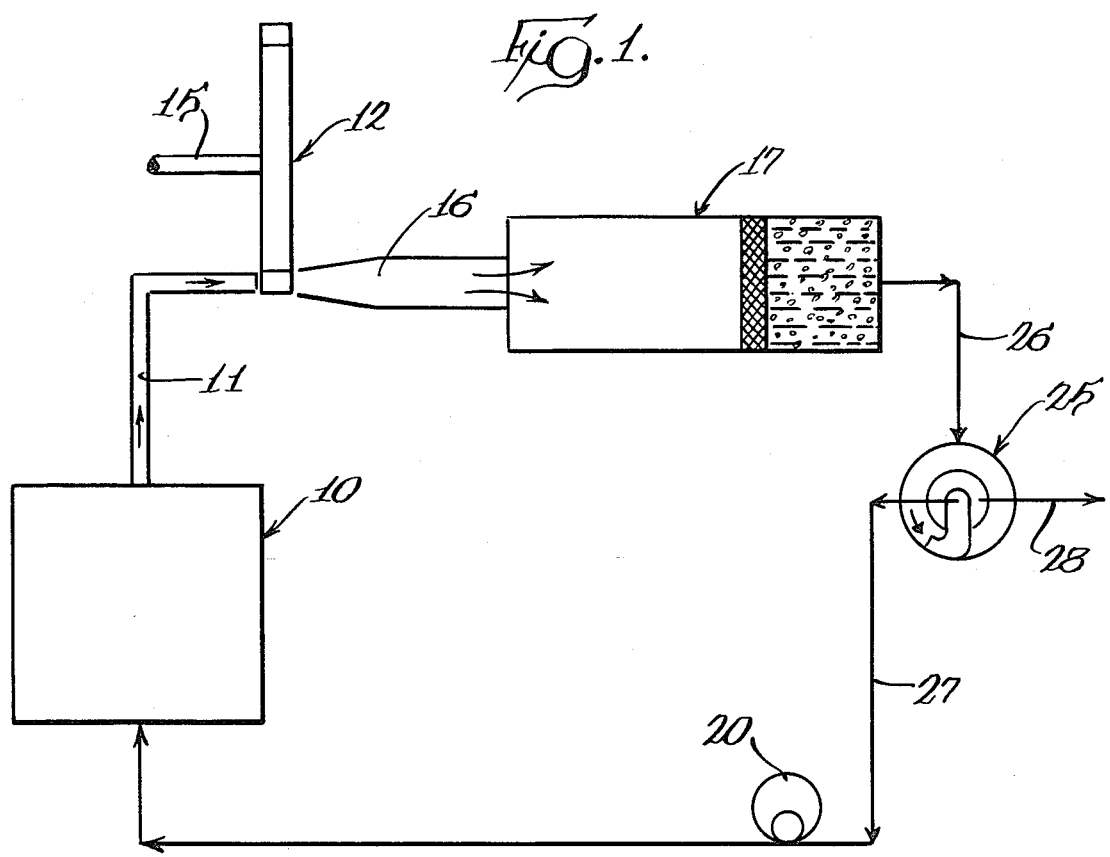
FIG. 1 is a schematic drawing of a steam system associated with a prime mover, such as a steam turbine.

The steam generating system in association with a prime mover is shown in FIG. 1, with the components being illustrated diagrammatically. A boiler, indicated generally at 10, provides high pressure steam through a line 11 which is directed to a steam turbine, indicated generally at 12, with the steam turbine driving an output shaft 15 which drives the propulsion system of a torpedo. Low pressure steam is exhausted from the turbine through a line 16 extending to a steam condenser, indicated generally at 17. The steam condenses into water within the steam condenser, with water being shown at the right-hand end thereof. In a conventional system, the water leaving the steam condenser can be returned to the boiler 10 by means of a main system pump 20. In the invention to be described, a deaerator, indicated generally at 25, and which performs additional functions, is interposed between the steam condenser 17 and the main system pump 20.

The deaerator removes air and other noncondensable gases that may be entrained in the water leaving the steam condenser 17 whereby the operation of the steam turbine 12 is improved. The deaerator 25 is connected to the outlet of the steam condenser 17 by a line 26. Liquid and, more particularly, water flows from the deaerator 25 to the main system pump 20 through a line 27. Air and other noncondensable gases are discharged from the deaerator 25 to a discharge area, as indicated diagrammatically by an arrow 28. In a steam-powered torpedo, the air would be discharged into a pressurized area within the torpedo and a feature of the invention is to pressurize the air removed from the water to a pressure in excess of that within the torpedo and without the pressure affecting the low back pressure at the outlet side of the steam turbine.

Figure 3:
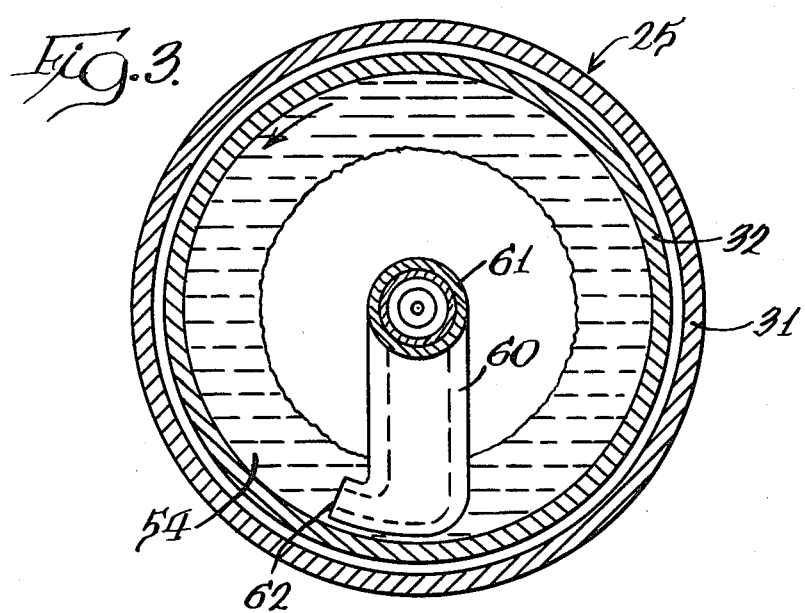
FIG. 3 is a vertical section, taken generally along the line 3—3 in FIG. 2.

The deaerator 25 is shown more particularly in FIGS. 2 and 3. The deaerator has a frame including a mounting panel 30 and a casing 31 within which a container, in the form of a rotatable drum 32 having a cylindrical wall, is positioned. The rotatable drum 32 has a shaft 33 extending from one end thereof which is rotatably mounted in the mounting plate 30 by a bearing 34. The opposite end of the drum is rotatably supported by a conduit 35 mounted within an opening in an end of the enclosure 31 and which carries a bearing 36 rotatably supporting an end wall 37 of the rotatable drum.

The interior of the rotatable drum 32 has a transverse wall 40 sealed at its periphery to the cylindrical wall of the rotatable drum and having a central opening through which an end of the conduit 35 extends. The line 26 extending from the steam condenser 17 connects to a fitting 41 at an end of the enclosure 31 having a passage which, through a connecting passage 42, communicates with the interior of the conduit 35 whereby water with entrained air and other gases can flow to the interior of the rotatable drum 32 and to the right of the transverse wall 40, as shown in FIG. 2. This flow is shown by arrows in FIG. 2, with the flow being about the exterior of a pipe 44 fitted within and spaced from the conduit 35. Sealing means, indicated generally at 50, are associated with the conduit 35 and the transverse wall 40 to effect a fluid seal between the conduit 35 and the liquid-retaining area of the rotatable drum 32. Sealing means, indicated generally at 51, seal the shaft end of the rotatable drum.

The rotatable drum 32 is rotated by drive means including a power source (not shown) which drivingly connects to a gear 52 fixed at an exposed end of the shaft 33. The rotatable drum 32 is rotated at a speed so that the centrifugal field is high enough to make liquid within the rotatable drum form an annulus within the rotatable drum and with the liquid annulus being indicated at 54. This centrifuging action results in separating air and other noncondensable gases from the water because of the high artificial (g) field present in the water, with the air migrating to the central part of the radial drum and radially inward of the liquid annulus 54.

A stationary pitot probe 60 is located within the rotatable drum and has a base 61 which is fitted onto the end of the pipe 44. The pitot probe has an entry end 62 opening in a direction which is opposed to the direction of rotation of the rotatable drum 32, as shown by the arrow in FIG. 3, and which is located adjacent the inner side of the cylindrical wall of the rotatable drum. The pitot probe receives or draws water under pressure from the rotating liquid annulus 54, with the water flowing through the interior of the pitot probe and through the pipe 44 which connects with the line 27 leading to the main system pump 20.

Air and other noncondensable gases are removed from the interior of the liquid annulus 54 and collected and pressurized preparatory to exhaust from the system. The structure for accomplishing this includes an ejector 70 mounted on the rotatable drum for rotation therewith. The ejector has a throat 71 and a generally conically-shaped inner cavity member 72 within a diffuser section providing an inner cavity which functions as a collecting chamber for air. This structure defines an air jet pump positioned to receive air from within the rotatable drum, with the pump being water driven by a nozzle 73 fitted into the base 61 of the pitot probe and communicating with water flowing under pressure through the pitot probe. A portion of the water flow passes through the nozzle with increased velocity and enters the throat 71 of the ejector and, in the process, draws air from the space interiorly of the liquid annulus 54. The water passing through the ejector migrates to the wall of the rotating ejector 70 and then, by centrifugal force, flows outwardly into the standpipes 75. The air and any other gases flowing through the ejector pass into the interior of the inner cavity member 72 by flowing through openings 80 therein. In normal operation, there is liquid within the standpipes 75 and also in the diffuser portion of the ejector 70. The water level in the standpipes is dependent on the pressures in the liquid annulus 54 and in the ejector. This results in a buildup of air pressure within the inner cavity member 72 and with the air pressure rise supported by the dynamic pressure recovery at the nozzle. The presence of this liquid also avoids any air blowback from within the inner cavity member 72.

Passage means from the collection chamber includes a passage 82 communicating with an internal space 83 within the shaft 33 and which has a radial passage communicating with a vent hole 84 in the enclosure 31 by means of a space between the mounting plate 30 and an end of the rotatable drum 32. A relief valve 85 acts on a valve seat to close the passage 82 from the space 83. When the pressure of the air within the inner cavity member 72 is sufficient to unseat the relief valve 85, the air can flow out through the vent hole 84. The relief valve functions to isolate the air collection chamber from the interior of the torpedo. The interior of the torpedo is a pressurized area and the air within the collection chamber is pressurized to a value above that in the pressurized area to assure removal of air from the collection chamber.

With the foregoing deaerator structure, it will be evident that entrained air and other gases are removed from water. The removal action results from rotating a liquid annulus 54 within the rotatable drum whereby the pitot probe picks up water under pressure for delivery to the main system pump 20 whereby cavitation thereof is avoided and with a part of the water being delivered flowing through a nozzle to draw air from the interior of the rotatable drum and cause pressurization thereof prior to removal of the air from the system. The rotatable drum 32 further functions as an accumulator to allow for different utilization rates of water, depending upon the power level of the system, with the size of the liquid annulus 54 varying dependent upon the liquid demands of the system with the only requirement being that the entry end 62 of the pitot probe be covered in all modes of operation.

I claim:

1. Apparatus removing air from a mixture of water with entrained air delivered from a steam condenser and used in a steam-generating system for powering a prime mover of a torpedo wherein the air must be discharged into a pressurized area within the torpedo comprising, means for centrifuging a volume of water and air within a container to separate the water from the air, means for drawing water from the container under pressure, a water-driven air jet pump within the container and communicating with the separated air vapor to pump air into a collection chamber and build up the pressure of the air in said collection chamber, means for diverting a portion of said water under pressure to said air jet pump, and means for discharging pressurized air from the collection chamber to the pressurized area of the torpedo when the pressure of the air exceeds that of the pressurized area of the torpedo.

2. Apparatus as defined in claim 1 wherein said container is of a size to hold sufficient water at different levels dependent on the demands of the steam-generating system.

3. Apparatus removing air from a mixture of water with entrained air delivered from a steam condenser and used in a steam-generating system for powering a prime mover of a torpedo wherein the air must be discharged into a pressurized area within the torpedo comprising, means for centrifuging a volume of water and air delivered from the steam condenser within a rotatable drum to separate the water from the air, a pitot probe in the rotatable drum for drawing water from the container under pressure, a water-driven air jet pump within the container and communicating with the separated air and to pump air into a collection chamber and build up the pressure of the air in said collection chamber, means for diverting a portion of said water under pressure to said air jet pump, and relief valve means for discharging pressurized air from the collection chamber to the pressurized area of the torpedo when the pressure of the air exceeds that of the pressurized area of the torpedo.

4. An apparatus usable in a steam generating system for removing entrained air from water and delivery of water under pressure to a boiler and discharging separated air under pressure comprising, rotatable drum means for collecting water with entrained air and separating the water by centrifugal action, passage means for receiving water under pressure from the rotatable drum means for delivery to said boiler, a collection chamber for air within said rotatable drum means and rotatable therewith, a jet pump centrally positioned within said rotatable drum means and supplied with water from said passage means for pumping air from said rotatable drum means to said collection chamber, means for directing water from the jet pump back to the interior of said rotatable drum means, and passage means from said collection chamber for exhaust of air externally of said rotatable drum means.

5. An apparatus for removing entrained air from liquid comprising, rotatable drum means for collecting liquid with entrained air and separating the liquid by centrifugal action, passage means for receiving liquid under pressure from the rotatable drum means, a collection chamber for air within said rotatable drum means and rotatable therewith, a jet pump centrally positioned within said rotatable drum means and supplied with liquid from said passage means for pumping air from said rotatable drum means to said collection chamber, and passage means from said collection chamber for exhaust of air externally of said rotatable drum means.

6. A device for accumulating liquid, removing air from the liquid and thereafter pumping the liquid for use comprising, a frame, a container rotatably mounted on the frame and having a cylindrical wall, means for rotating the container, a pitot probe within the container with an entry end opening in a direction which is opposed to the direction of rotation of the container and located adjacent the cylindrical wall, a pipe fixed to the frame and extending into the container for mounting the pitot probe and for receiving a flow of pressurized liquid from the pitot probe, a nozzle communicating with the liquid flow from the pitot probe, an ejector spaced from the nozzle and having a throat opening toward the nozzle and a passage extending therefrom, said ejector being rotatable with the container and having openings communicating with passages extending toward the cylindrical wall of the container for flow of liquid therethrough, a collection chamber positioned centrally within the ejector passage for receiving air, and a relief valve positioned in an outlet from the said collection chamber and openable in response to a pressure build up in the collection chamber to vent the collection chamber.

7. A centrifugal separator having a frame, a drum rotatably mounted on said frame, means for delivering a combination of liquid and air to the drum, means for withdrawing water under pressure from the drum, means within the drum for collecting and pressurizing a portion of the air within the drum, and means operable in response to a predetermined pressure of the air in said collecting and pressurizing means for venting thereof.

8. A centrifugal separator as defined in claim 7 wherein said means for collecting and pressurizing the air comprises an ejector having a throat and a nozzle spaced from said throat and supplied with water under pressure from said water withdrawing means.

9. A centrifugal separator as defined in claim 7 wherein said operable means includes a valve member urged toward a closed position against the pressure of the air in said pressurizing and collecting means.

10. The method of removing air from a mixture of water with entrained air delivered from a steam condenser and used in a steam-generating system for powering a prime mover of a torpedo wherein the air must be discharged into a pressurized area within the torpedo comprising, centrifuging a volume of water and air within a container to separate the water from the air, drawing water from the container under pressure, diverting a portion of said water under pressure to a water-driven air jet pump communicating with the separated air to pump air into a collection chamber and build up the pressure of the air in said collection chamber, and discharging pressurized air from the collection chamber to the pressurized area of the torpedo when the pressure of the air exceeds that of the pressurized area of the torpedo.

11. The method of removing air from liquid with entrained air comprising, centrifuging a volume of liquid and air within a rotatable drum to separate the liquid from the air, positioning a pitot probe within the rotatable drum to draw liquid from the rotatable drum under pressure, diverting a portion of said liquid under pressure to a liquid-driven air jet pump located within the rotatable drum and communicating with the separated air to pump air into a collection chamber and build up the pressure of the air in said collection chamber, and discharging pressurized air from the collection chamber.

\* \* \* \* \*